T. S. MAULTSBY.
COMBINED GARDEN IMPLEMENT.
APPLICATION FILED DEC. 7, 1918.
1,335,006.
Patented Mar. 30, 1920.
2 SHEETS—SHEET 1.
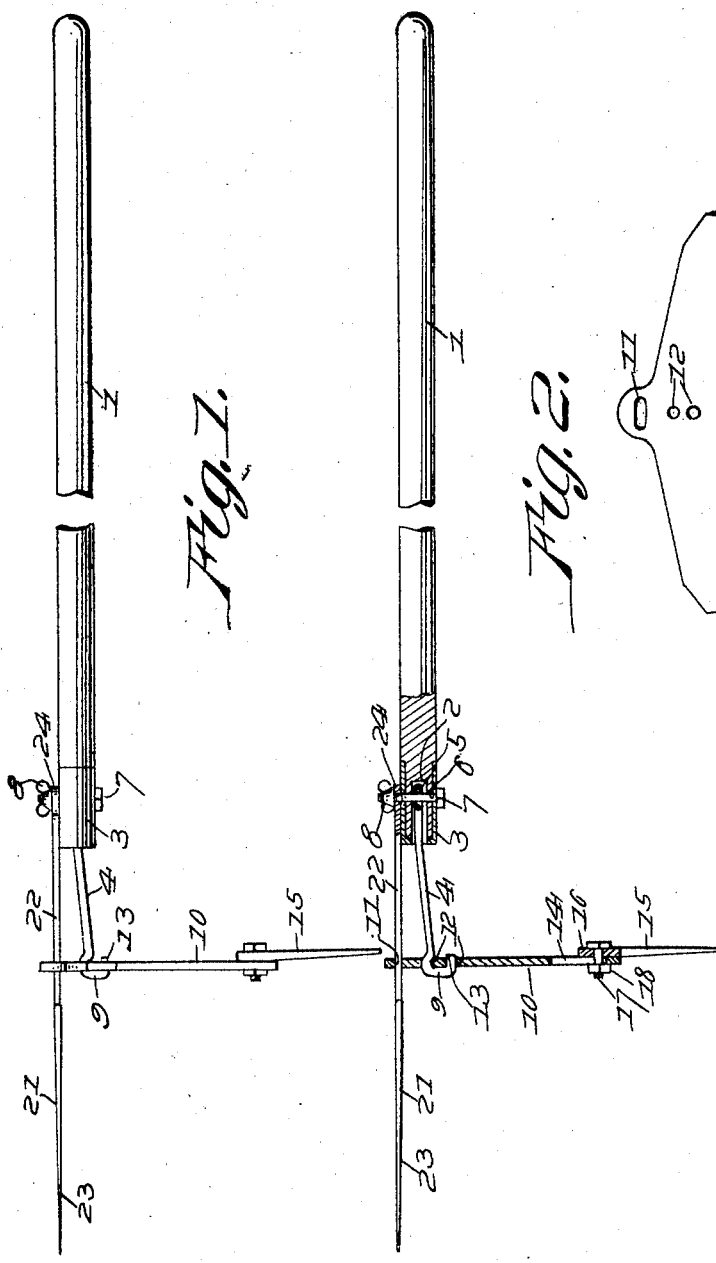
Inventor
T. S. Maultsby,
By
Attorney

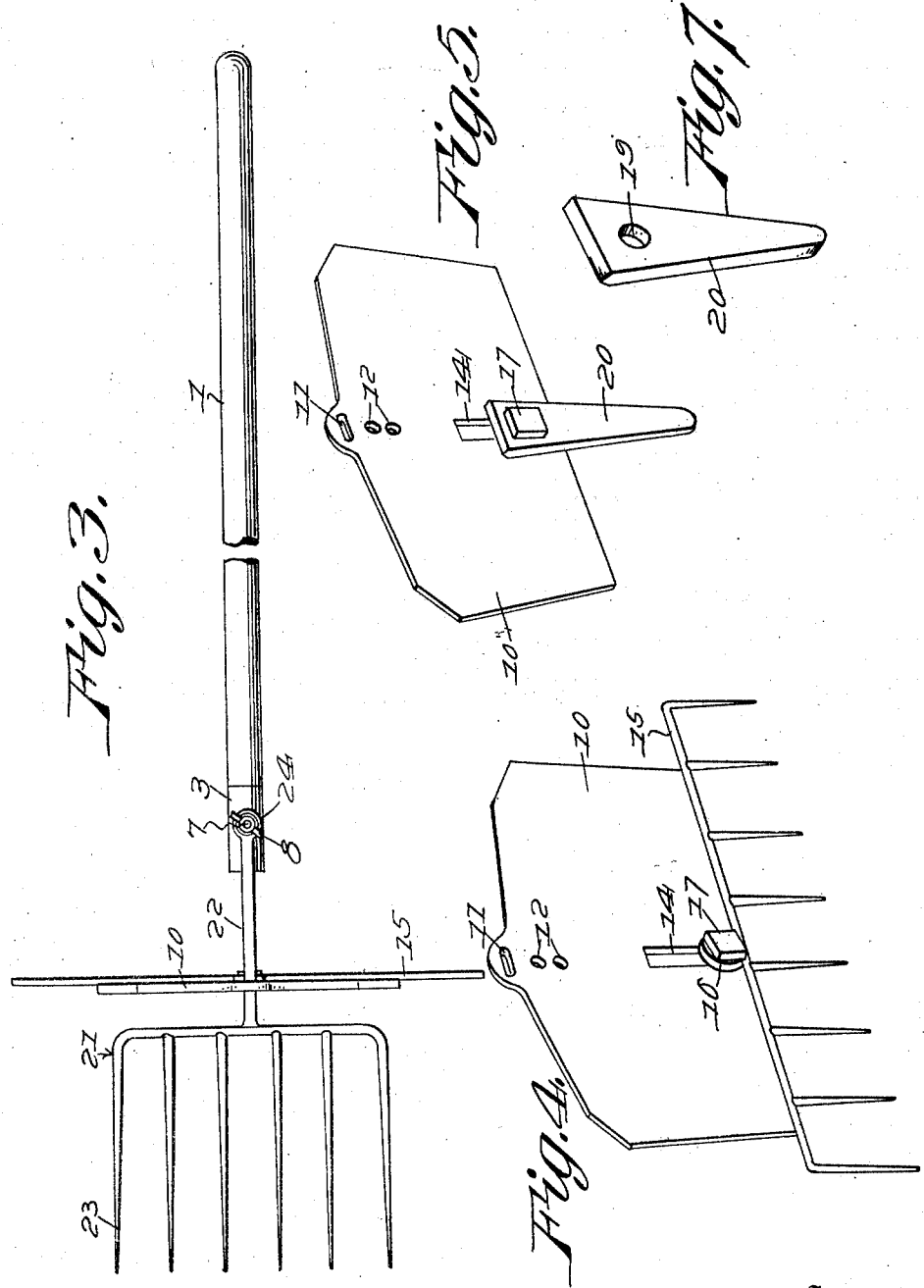

UNITED STATES PATENT OFFICE.

TONY SAMUEL MAULTSBY, OF GREENVILLE, NORTH CAROLINA.

COMBINED GARDEN IMPLEMENT.

1,335,006.   Specification of Letters Patent.   Patented Mar. 30, 1920.

Application filed December 7, 1918. Serial No. 265,717.

*To all whom it may concern:*

Be it known that I, TONY S. MAULTSBY, a citizen of the United States, residing at Greenville, in the county of Pitt and State of North Carolina, have invented new and useful Improvements in Combined Garden Implements, of which the following is a specification.

This invention has reference generally to that class of inventions known as harrows and diggers and more particularly relates to a combined garden implement.

The invention has for its principal aim and object to provide a device of the above mentioned character designed to act in the capacity of a hoe, rake, pitch fork and row opener.

More particularly the present invention contemplates the provision of a device of the above mentioned character embodying the general construction of a hoe and a handle therefor while the other implements such as the rake, pitch fork and row opener are designed so as to be respectively connected to the hoe and to the handle.

It is a more specific object of this invention to provide a device of the above mentioned character wherein the blade of the hoe is of novel construction being peculiarly designed for effectively receiving the other implements; to provide improved means for detachably connecting the pitch fork, the rake and the row opener respectively to the handle and the blade of the hoe.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:

Figure 1 is a side elevation of the invention showing the rake and the pitch fork as well as the hoe in position.

Fig. 2 is a longitudinal sectional detail showing the hoe and the pitch fork connected to the handle.

Fig. 3 is a top plan view thereof.

Fig. 4 is a perspective detail showing the rake attached to the hoe.

Fig. 5 is a perspective detail showing the row opener attached to the hoe, and

Fig. 6 is an elevational detail of the hoe detached.

Fig. 7 is a perspective view of the row opener.

Similar characters of reference are employed in all of the above described views, to indicate corresponding parts.

Referring now, more particularly, to the accompanying drawings there is provided a handle 1 of suitable material the outer end of which is provided with an inwardly extending socket 2 and the outer portion of the handle is reinforced by a ferrule 3. A hoe shank 4 is disposed in the socket and terminates at its inner end in an eye 5 while the handle is provided with a transverse opening 6 which intersects the socket and through this opening 6 is inserted a retaining bolt 7 which is also passed through the eye 5 and has a projecting threaded extremity engaged by a wing nut 8 which serves to removably anchor the shank 4 in position. The outer end of the shank terminates in an offset hook 9.

As intimated, a hoe of improved construction is provided consisting of a substantially rectangular blade like body 10 which is formed near its upper edge and medially of its ends with a series of openings 11 and 12 the former for a purpose that will presently appear while the openings 12 receive the hook 9 so that the bill of the hook may abut the front face of the hoe while the nose 13 is extended through the lower opening 12 so as to anchor the shank and hoe blade together.

In order that other implements may be attached to the blade of the hoe the same is provided with a central and vertical slot 14. A rake head 15 is now employed and is formed in its upper edge with an upright loop 16 while engaged through this loop and adjustable in the slot is a retaining bolt 17 the outer threaded terminal of which is engaged by a nut 18 which coacts with the head of the bolt in clamping the rake head in the desired position of adjustment with respect to the hoe blade so that the teeth of the rake head will depend beneath the lower edge of the hoe blade as indicated. Instead of fastening the rake head to the hoe blade the bolt 17 may be engaged through an opening 19 in the body of the tapered row opener 20, this arrangement being clearly illustrated in Fig. 5.

When it is desired to use the device for lifting straw, hay, etc., a pitch fork generally indicated by the numeral 21 is employed and includes a tapered shank 22 from which project a plurality of tines 23. The inner end of the pitch fork shank terminates in an eye 24 and in attaching the pitch fork to the hoe and handle the shank 22 is inserted through the large opening 11 in the hoe blade 10 and is of such a length that when the connection occurs between the shank 23 and the opening 11 the eye 24 will be disposed above the bolt 7. The wing nut 8, of course, is removed to permit of the engagement of the eye 24 about the bolt and is subsequently attached as indicated so as to securely yet detachably fasten the pitch fork in position.

It is believed in view of the foregoing description that a further detailed description of the operation of the invention is entirely unnecessary. Likewise it is believed that the advantages of the invention will be readily apparent. However, attention may be called to the fact that the hoe blade is at all times rigidly connected with the handle but when it is desired to use either the rake or the row opener the pitch fork may be disconnected and when the pitch fork is used the rake and the row opener may be disconnected.

What is claimed as new is:

1. A garden implement of the character described including a handle, a hoe blade formed with an opening, a shank extending therefrom and inserted in the handle, a pitch fork including a shank inserted in the opening in the blade and tines projecting therefrom, and fastening means in the handle engaging and anchoring the first mentioned shank and the shank of the pitch fork.

2. A garden implement of the character described comprising a handle formed in its inner end with an inwardly extending socket and also provided with a transverse opening intersecting the socket, a hoe blade formed with a large opening near its upper edge, a shank connected to the hoe blade and inserted in the socket in the handle terminating in an eye, a pitch fork comprising a shank inserted through the opening in the blade, and tines projecting from the shank, an eye formed at the terminal of the pitch fork shank, a bolt inserted through the opening in the handle and engaged with the eyes on the shanks, and a wing nut engageable with the bolt for connecting the shanks to the handle.

In testimony whereof I affix my signature.

TONY SAMUEL MAULTSBY.